(12) United States Patent
Gupta et al.

(10) Patent No.: US 10,341,328 B2
(45) Date of Patent: Jul. 2, 2019

(54) SECURE ON-LINE SIGN-UP AND PROVISIONING FOR WI-FI HOTSPOTS USING A DEVICE-MANAGEMENT PROTOCOL

(71) Applicant: Intel Corporation, Santa Clara, CA (US)

(72) Inventors: Vivek Gupta, San Jose, CA (US); Necati Canpolat, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/431,149

(22) Filed: Feb. 13, 2017

(65) Prior Publication Data

US 2017/0290088 A1  Oct. 5, 2017

Related U.S. Application Data

(63) Continuation of application No. 13/188,205, filed on Jul. 21, 2011, now Pat. No. 9,571,482.

(51) Int. Cl.
*H04L 29/06* (2006.01)
*H04W 12/06* (2009.01)
(Continued)

(52) U.S. Cl.
CPC ...... *H04L 63/0823* (2013.01); *H04L 41/0806* (2013.01); *H04L 41/28* (2013.01);
(Continued)

(58) Field of Classification Search
CPC ..... H04L 41/0806; H04L 41/28; H04L 63/08; H04L 63/0823–63/0846; H04L 63/0876;
(Continued)

(56) References Cited

U.S. PATENT DOCUMENTS 7,551,577 B2   6/2009  McRae
7,944,901 B2   5/2011  Souissi et al.
(Continued)

FOREIGN PATENT DOCUMENTS

CN   101523870 A   9/2009
CN   102857997 A   1/2013
(Continued)

OTHER PUBLICATIONS

Wireless Broadband Alliance."WISPr 2.0", Doc Ref. No. WBA/RM/WISPr, Version 01.00. Published: Apr. 8, 2010. (Year: 2010).*
(Continued)

*Primary Examiner* — Kevin Bechtel
(74) *Attorney, Agent, or Firm* — Schwegman Lundberg & Woessner, P.A.

(57) ABSTRACT

Embodiments of a mobile device and method for secure on-line sign-up and provisioning of credentials for Wi-Fi hotspots are generally described herein. In some embodiments, the mobile device may be configured to establish a transport-layer security (TLS) session with a sign-up server through a Wi-Fi Hotspot to receive a certificate of the sign-up server. When the certificate is validated, the mobile device may be configured to exchange device management messages with the sign-up server to sign-up for a Wi-Fi subscription and provisioning of credentials, and retrieve a subscription management object (MO) that includes a reference to the provisioned credentials for storage in a device management tree. The credentials are transferred/provisioned securely to the mobile device. In some embodiments, an OMA-DM protocol may be used. The provisioned credentials may include certificates in the case of certificate-based credentials, machine-generated credentials such as username/password credentials, or SIM-type credentials.

21 Claims, 4 Drawing Sheets

(51) Int. Cl.
*H04L 29/08* (2006.01)
*H04L 12/24* (2006.01)
*H04W 4/50* (2018.01)
*H04W 84/12* (2009.01)
*H04W 76/12* (2018.01)

(52) U.S. Cl.
CPC .......... *H04L 63/164* (2013.01); *H04L 67/125* (2013.01); *H04W 4/50* (2018.02); *H04W 12/06* (2013.01); *H04L 67/02* (2013.01); *H04W 76/12* (2018.02); *H04W 84/12* (2013.01)

(58) Field of Classification Search
CPC ..... H04L 63/164; H04L 67/02; H04L 67/125; H04W 4/001; H04W 12/04–08; H04W 84/12
See application file for complete search history.

(56) References Cited

U.S. PATENT DOCUMENTS

| | | |
|---|---|---|
| 8,340,057 B2 | 12/2012 | Abujbara |
| 8,352,643 B2 | 1/2013 | Birnbaum |
| 8,400,990 B1 | 3/2013 | Volpano et al. |
| 8,588,413 B1 | 11/2013 | Kalbag et al. |
| 8,590,023 B2 | 11/2013 | Gupta et al. |
| 8,750,180 B2 | 6/2014 | McCann et al. |
| 8,838,070 B2 | 9/2014 | Zhang et al. |
| 8,913,559 B2 | 12/2014 | Chen et al. |
| 9,084,081 B2 | 7/2015 | Gupta et al. |
| 9,307,408 B2 | 4/2016 | Gupta et al. |
| 9,479,595 B2 | 10/2016 | Canpolat et al. |
| 9,571,482 B2 | 2/2017 | Gupta et al. |
| 9,635,555 B2 | 4/2017 | Gupta et al. |
| 9,992,671 B2 | 6/2018 | Gupta et al. |
| 2003/0028805 A1* | 2/2003 | Lahteenmaki ...... H04L 63/0823 726/6 |
| 2004/0210468 A1 | 10/2004 | Rubel et al. |
| 2004/0235455 A1 | 11/2004 | Jiang |
| 2005/0260996 A1 | 11/2005 | Groenendaal et al. |
| 2006/0045267 A1 | 3/2006 | Moore et al. |
| 2006/0072527 A1 | 4/2006 | Beck et al. |
| 2006/0173976 A1 | 8/2006 | Vincent et al. |
| 2006/0221917 A1 | 10/2006 | McRae |
| 2006/0236105 A1 | 10/2006 | Brok et al. |
| 2006/0280128 A1 | 12/2006 | Abdel |
| 2006/0286977 A1 | 12/2006 | Khandelwal et al. |
| 2007/0066306 A1 | 3/2007 | Cheng |
| 2007/0223432 A1 | 9/2007 | Badarinath |
| 2007/0294385 A1 | 12/2007 | Kapadekar et al. |
| 2008/0140814 A1 | 6/2008 | Cohen |
| 2008/0181187 A1 | 7/2008 | Scott et al. |
| 2008/0220741 A1 | 9/2008 | Hung |
| 2008/0225805 A1 | 9/2008 | Pearson et al. |
| 2009/0028082 A1 | 1/2009 | Wynn et al. |
| 2009/0199281 A1 | 8/2009 | Cai et al. |
| 2009/0260070 A1 | 10/2009 | Soliman |
| 2010/0031029 A1 | 2/2010 | Ilyadis |
| 2010/0124881 A1 | 5/2010 | Uppunda et al. |
| 2010/0195562 A1 | 8/2010 | Ishizu et al. |
| 2010/0211993 A1 | 8/2010 | Islam et al. |
| 2010/0226274 A1 | 9/2010 | Burbidge et al. |
| 2010/0290424 A1 | 11/2010 | Collingrige |
| 2010/0325425 A1 | 12/2010 | Park et al. |
| 2011/0007705 A1 | 1/2011 | Buddhikot et al. |
| 2011/0055411 A1 | 3/2011 | Taaghol |
| 2011/0130117 A1 | 6/2011 | Fan et al. |
| 2011/0149874 A1 | 6/2011 | Reif et al. |
| 2011/0154454 A1 | 6/2011 | Frelechoux et al. |
| 2011/0268027 A1 | 11/2011 | Nogawa |
| 2011/0269449 A1 | 11/2011 | Kazmi et al. |
| 2011/0300865 A1 | 12/2011 | Kashikar et al. |
| 2012/0036992 A1 | 2/2012 | Friedrich |
| 2012/0047245 A1 | 2/2012 | Zhou et al. |
| 2012/0063509 A1 | 3/2012 | Coulter |
| 2012/0071139 A1 | 3/2012 | Kumar et al. |
| 2012/0072976 A1 | 3/2012 | Patil et al. |
| 2012/0149334 A1 | 6/2012 | Zhang et al. |
| 2012/0203824 A1 | 8/2012 | Oommen |
| 2012/0210404 A1 | 8/2012 | Patil et al. |
| 2012/0258709 A1 | 10/2012 | Swaminathan et al. |
| 2012/0284785 A1 | 11/2012 | Salkintzis et al. |
| 2013/0007853 A1 | 1/2013 | Gupta et al. |
| 2013/0024921 A1 | 1/2013 | Gupta et al. |
| 2013/0103939 A1 | 4/2013 | Radpour |
| 2013/0232561 A1 | 9/2013 | Gupta et al. |
| 2013/0298209 A1 | 11/2013 | Targali et al. |
| 2014/0029512 A1 | 1/2014 | Chu et al. |
| 2014/0080450 A1 | 3/2014 | Gupta et al. |
| 2014/0134980 A1 | 5/2014 | Singh et al. |
| 2014/0185597 A1 | 7/2014 | Gupta et al. |
| 2015/0110096 A1 | 4/2015 | Gupta et al. |
| 2015/0180978 A1 | 6/2015 | Canpolat et al. |
| 2015/0350871 A1 | 12/2015 | Gupta et al. |
| 2016/0308976 A1 | 10/2016 | Canpolat et al. |
| 2017/0099184 A1* | 4/2017 | Oommen ............ H04L 41/0809 |
| 2017/0230823 A1 | 8/2017 | Gupta et al. |

FOREIGN PATENT DOCUMENTS

| | | |
|---|---|---|
| CN | 103688565 A | 3/2014 |
| CN | 104798430 A | 7/2015 |
| CN | 104982072 A | 10/2015 |
| CN | 105376219 A | 3/2016 |
| CN | 105635165 A | 6/2016 |
| CN | 102857997 B | 8/2016 |
| CN | 106028333 A | 10/2016 |
| CN | 103688565 B | 2/2018 |
| CN | 108063689 A | 5/2018 |
| EP | 2673986 A1 | 12/2013 |
| EP | 2727415 A2 | 5/2014 |
| EP | 2735183 B1 | 9/2016 |
| JP | 2005005790 A | 1/2005 |
| JP | 2006505201 A | 2/2006 |
| JP | 2006523412 A | 10/2006 |
| JP | 2009005011 A | 1/2009 |
| JP | 2009512257 A | 3/2009 |
| JP | 2009141664 A | 6/2009 |
| JP | 2010062914 A | 3/2010 |
| JP | 2011501626 A | 1/2011 |
| JP | 2014526726 A | 10/2014 |
| JP | 2016034166 A | 3/2016 |
| JP | 5918337 B2 | 5/2016 |
| KR | 101547541 B1 | 8/2015 |
| KR | 101589423 B1 | 1/2016 |
| KR | 101662607 B1 | 10/2016 |
| WO | WO-2004084465 A2 | 9/2004 |
| WO | WO-2007024400 A2 | 3/2007 |
| WO | WO-2010050755 A2 | 5/2010 |
| WO | WO-2010098035 A1 | 9/2010 |
| WO | WO-2010124162 A2 | 10/2010 |
| WO | WO-2010141437 A2 | 12/2010 |
| WO | WO-2011016947 A2 | 2/2011 |
| WO | WO-2012036992 A2 | 3/2012 |
| WO | WO-2012107639 A1 | 8/2012 |
| WO | WO-2012110694 A1 | 8/2012 |
| WO | WO-2013002956 A2 | 1/2013 |
| WO | WO-2013002956 A3 | 1/2013 |
| WO | WO-2013013040 A2 | 1/2013 |
| WO | WO-2013013040 A3 | 1/2013 |
| WO | WO-2013066348 A1 | 5/2013 |
| WO | WO-2014105114 A1 | 7/2014 |
| WO | WO-2014123576 A1 | 8/2014 |

OTHER PUBLICATIONS

"A new program from the Wi-Fi Alliance to enable seamless Wi-Fi access in hotspots", Wi-Fi Certified Passpoint, (Jun. 2012), 11 pgs.

"U.S. Appl. No. 13/173,338, Response filed Apr. 29, 2013 to Non Final Office Action dated Nov. 29, 2012", 12 pgs.

"U.S. Appl. No. 13/173,338, Non Final Office Action dated Nov. 29, 2012", 18 pgs.

(56) References Cited

OTHER PUBLICATIONS

"U.S. Appl. No. 13/173,338, Notice of Allowance dated Jul. 9, 2013", 6 pgs.
"U.S. Appl. No. 13/188,205, Advisory Action dated Mar. 18, 2016", 5 pgs.
"U.S. Appl. No. 13/188,205, Examiner Interview Summary dated Mar. 10, 2016", 3 pgs.
"U.S. Appl. No. 13/188,205, Examiner Interview Summary dated Sep. 21, 2015", 3 pgs.
"U.S. Appl. No. 13/188,205, Examiner Interview Summary dated Nov. 18, 2013", 3 pgs.
"U.S. Appl. No. 13/188,205, Final Office Action dated Aug. 9, 2013", 23 pgs.
"U.S. Appl. No. 13/188,205, Final Office Action dated Oct. 13, 2015", 25 pgs.
"U.S. Appl. No. 13/188,205, Non Final Office Action dated Mar. 17, 2015", 22 pgs.
"U.S. Appl. No. 13/188,205, Non Final Office Action dated Mar. 20, 2013", 22 pgs.
"U.S. Appl. No. 13/188,205, Notice of Allowance dated Oct. 3, 2016", 19 pgs.
"U.S. Appl. No. 13/188,205, Response filed Mar. 23, 2016 to Final Office Action dated Oct. 13, 2015", 13 pgs.
"U.S. Appl. No. 13/188,205, Response filed Jun. 17, 2015 to Non Final Office Action dated Mar. 17, 2015", 8 pgs.
"U.S. Appl. No. 13/188,205, Response filed Jul. 19, 2013 to Non Final Office Action dated Mar. 20, 2013", 16 pgs.
"U.S. Appl. No. 13/188,205, Response filed Dec. 9, 2013 to Final Office Action dated Aug. 9, 2013", 13 pgs.
"U.S. Appl. No. 13/512,105, Final Office Action dated Jan. 22, 2014", 12 pgs.
"U.S. Appl. No. 13/512,105, Non Final Office Action dated Aug. 15, 2013", 10 pgs.
"U.S. Appl. No. 13/512,105, Preliminary Amendment filed May 25, 2012", 3 pgs.
"U.S. Appl. No. 13/512,105, Response filed Dec. 16, 2013 to Non Final Office Action dated Aug. 15, 2013", 10 pgs.
"U.S. Appl. No. 13/728,606, Non Final Office Action dated Jul. 2, 2015", 6 pgs.
"U.S. Appl. No. 13/728,606, Notice of Allowance dated Nov. 25, 2015", 7 pgs.
"U.S. Appl. No. 13/728,606, Preliminary Amendment filed Dec. 23, 2014", 8 pgs.
"U.S. Appl. No. 13/728,606, Response filed May 13, 2015 to Restriction Requirement dated Mar. 17, 2015", 8 pgs.
"U.S. Appl. No. 13/728,606, Response filed Oct. 2, 2015 to Non Final Office Action dated Jul. 2, 2015", 7 pgs.
"U.S. Appl. No. 13/728,606, Restriction Requirement dated Mar. 17, 2015", 5 pgs.
"U.S. Appl. No. 14,580,839, Preliminary Amendment filed Dec. 26, 2014", 6 pgs.
"U.S. Appl. No. 14/083,028, Advisory Action dated Oct. 28, 2014", 3 pgs.
"U.S. Appl. No. 14/083,028, Final Office Action dated Aug. 18, 2014", 17 pgs.
"U.S. Appl. No. 14/083,028, Non Final Office Action dated Apr. 30, 2014", 15 pgs.
"U.S. Appl. No. 14/083,028, Notice of Allowance dated Mar. 10, 2015", 7 pgs.
"U.S. Appl. No. 14/083,028, Response filed Oct. 20, 2014 to Final Office Action dated Aug. 18, 2014", 12 pgs.
"U.S. Appl. No. 14/083,028, Response filed Jul. 30, 2014 to Non-Final Office Action dated Apr. 30, 2014", 12 pgs.
"U.S. Appl. No. 14/124,767, Advisory Action dated Feb. 24, 2016", 3 pgs.
"U.S. Appl. No. 14/124,767, Final Office Action dated Nov. 30, 2015", 36 pgs.
"U.S. Appl. No. 14/124,767, Non Final Office Action dated Aug. 13, 2015", 28 pgs.

"U.S. Appl. No. 14/124,767, Notice of Allowance dated Jun. 14, 2016", 12 pgs.
"U.S. Appl. No. 14/124,767, Preliminary Amendment filed Dec. 6, 2013", 9 pgs.
"U.S. Appl. No. 14/124,767, Response filed Feb. 1, 2016 to Final Office Action dated Nov. 30, 2015", 12 pgs.
"U.S. Appl. No. 14/124,767, Response filed Oct. 29, 2015 to Non Final Office Action dated Aug. 13, 2015", 10 pgs.
"U.S. Appl. No. 14/580,839, Corrected Notice of Allowance dated Jan. 31, 2017", 8 pgs.
"U.S. Appl. No. 14/580,839, Non Final Office Action dated Aug. 11, 2016", 7 pgs.
"U.S. Appl. No. 14/580,839, Notice of Allowance dated Dec. 19, 2016", 5 pgs.
"U.S. Appl. No. 14/580,839, Response filed Nov. 4, 2016 to Non Final Office Action dated Aug. 11, 2016", 7 pgs.
"U.S. Appl. No. 14/731,668, Advisory Action dated Nov. 4, 2016", 2 pgs.
"U.S. Appl. No. 14/731,668, Final Office Action dated Jul. 19, 2016", 16 pgs.
"U.S. Appl. No. 14/731,668, Non Final Office Action dated Jan. 11, 2017", 18 pgs.
"U.S. Appl. No. 14/731,668, Non Final Office Action dated Feb. 26, 2016", 19 pgs.
"U.S. Appl. No. 14/731,668, Preliminary Amendment filed Aug. 14, 2015", 6 pgs.
"U.S. Appl. No. 14/731,668, Response filed Oct. 19, 2016 to Final Office Action dated Jul. 19, 2016", 8 pgs.
"U.S. Appl. No. 14/731,668, Response filed Nov. 18, 2016 to Final Office Action dated Jul. 19, 2016", 8 pgs.
"U.S. Appl. No. 14/731,669, Response filed Jun. 27, 2016 to Non Final Office Action dated Feb. 26, 2016", 8 pgs.
"U.S. Appl. No. 15/495,404, Preliminary Amendment filed May 15, 2017", 6 pgs.
"Chinese Application Serial No. 201210220574.0, Amendment filed Apr. 16, 2013", W/ English Claims, 8 pgs.
"Chinese Application Serial No. 201210220574.0, Office Action dated Jan. 15, 2016", W/ English Translation, 8 pgs.
"Chinese Application Serial No. 201210220574.0, Office Action dated Mar. 30, 2015", W/ English Translation, 16 pgs.
"Chinese Application Serial No. 201210220574.0, Office Action dated Jul. 2, 2014", W/ English Translation, 21 pgs.
"Chinese Application Serial No. 201210220574 Office Action dated Oct. 10, 2015", W/ English Translation, 6 pgs.
"Chinese Application Serial No. 201210220574.0, Response filed Mar. 25, 2016 to Office Action dated Jan. 15, 2016", W/ English Claims, 11 pgs.
"Chinese Application Serial No. 201210220574.0, Response filed Jun. 15, 2015 to Office Action dated Mar. 30, 2015", W/ English Claims, 10 pgs.
"Chinese Application Serial No. 201210220574.0, Response filed Nov. 17, 2014 to Office Action dated Jul. 2, 2014", W/ English Claims, 10 pgs.
"Chinese Application Serial No. 201210220574.0, Response filed Dec. 18, 2015 to Office Action dated Oct. 10, 2015", W/ English Claims, 13 pgs.
"Chinese Application Serial No. 201280036196.9, Office Action dated Feb. 13, 2017", w/ English Translation, 7pgs.
"Chinese Application Serial No. 201280036196.9, Office Action dated Jul. 21, 2016", W/ Machine Translation, 14 pgs.
"Chinese Application Serial No. 201280036196.9, Response filed Apr. 27, 2017 to Office Action dated Feb. 13, 2017", w/ claims in English, 48 pgs.
"Chinese Application Serial No. 201280036196.9, Response filed Dec. 5, 2016 to Office Action dated Jul. 21, 2016", w/ Claims in English, 26 pgs.
"Chinese Application Serial No. 201380060673.X, Voluntary Amendment dated Oct. 28, 2015", w/ English Claims, 17 pgs.
"Chinese Application Serial No. 201280036196.9, Office Action dated Jun. 19, 2017", 7 pgs w/ English Trans.
"European Application Serial No. 12804461.7, Communication Pursuant to Article 94(3) EPC dated Aug. 10, 2016", 5 pgs.

(56) References Cited

OTHER PUBLICATIONS

"European Application Serial No. 12804461.7, Extended European Search Report dated Feb. 17, 2015", 7 pgs.
"European Application Serial No. 12804461.7, Response filed Sep. 10, 2015 to Extended European Search Report dated Feb. 17, 2015", 6 pgs.
"European Application Serial No. 12804461.7, Response filed Dec. 7, 2016 to Communication Pursuant to Article 94(3) EPC dated Aug. 10, 2016", 11 pgs.
"European Application Serial No. 12814178.5, Extended European Search Report dated Apr. 9, 2015", 10 pgs.
"European Application Serial No. 12814178.5, Response filed to Oct. 15, 2015 Extended European Search Report dated Apr. 9, 2015", 26 pgs.
"European Application Serial No. 13867091.4, Extended European Search Report dated Jun. 16, 2016", 6 pgs.
"European Application Serial No. 13867091.4, Response filed Dec. 20, 2016 to Extended European Search Report dated Jun. 16, 2016", 11 pgs.
"European Application Serial No. 13874312.5, Extended European Search Report dated Aug. 16, 2016", 10 pgs.
"European Application Serial No. 13874312.5, Preliminary Amendment filed Jul. 2, 2015", 9 pgs.
"European Application Serial No. 13874312.5, Response filed May 31, 2017 to Extended European Search Report dated Aug. 16, 2016", w/ English Translation, 15 pgs.
"European Application Serial No. 15192254.9, Extended European Search Report dated Jan. 18, 2016", 8 pgs.
"European Application Serial No. 16181514.7, Extended European Search Report dated Nov. 29, 2016", 9 pgs.
"Hotspot 2.0 (Release 2) Technical Specification: Version 1.20a", Wi-Fi Alliance Technical Committee Hotspot 2.0 Technical Task Group, (2012), 145 pgs.
"International Application Serial No. PCT/US2011/059367, International Preliminary Report on Patentability dated May 15, 2014", 7 pgs.
"International Application Serial No. PCT/US2011/059367, International Search Report dated Apr. 24, 2012", 3 pgs.
"International Application Serial No. PCT/US2011/059367, Written Opinion dated Apr. 24, 2012", 5 pgs.
"International Application Serial No. PCT/US2012/040470, International Preliminary Report on Patentability dated Jan. 16, 2014", 6 pgs.
"International Application Serial No. PCT/US2012/040470, Search Report dated Dec. 27, 2012", 3 pgs.
"International Application Serial No. PCT/US2012/040470, Written Opinion dated Dec. 27, 2012", 3 pgs.
"International Application Serial No. PCT/US2012/047403, International Preliminary Report on Patentability dated Jan. 30, 2014", 6 pgs.
"International Application Serial No. PCT/US2012/047403, International Search Report dated Jan. 21, 2013", 3 pgs.
"International Application Serial No. PCT/US2012/047403, Written Opinion dated Jan. 21, 2013", 4 pgs.
"International Application Serial No. PCT/US2013/044238, International Preliminary Report on Patentability dated Jul. 9, 2015", 8 pgs.
"International Application Serial No. PCT/US2013/044238, International Search Report dated Aug. 27, 2013", 3 pgs.
"International Application Serial No. PCT/US2013/044238, Written Opinion dated Aug. 27, 2013", 6 pgs.
"International Application Serial No. PCT/US2013/052743, International Preliminary Report on Patentability dated Aug. 20, 2015", 7 pgs.
"International Application Serial No. PCT/US2013/052743, International Search Report dated Nov. 1, 2013", 3 pgs.
"International Application Serial No. PCT/US2013/052743, Written Opinion dated Nov. 1, 2013", 5 pgs.
"Japanese Application Serial No. 2012-128614, Office Action dated Feb. 4, 2014", w/English translation, 4 pgs.
"Japanese Application Serial No. 2012-128614, Office Action dated May 7, 2013", w/English translation, 9 pgs.
"Japanese Application Serial No. 2012-128614, Response filed Apr. 25, 2014 to Office Action dated Feb. 4, 2014", w/English claims, 17 pgs.
"Japanese Application Serial No. 2012-128614, Response filed Aug. 7, 2013 to Office Action dated May 7, 2013", w/English claims, 17 pgs.
"Japanese Application Serial No. 2012-128614, Voluntary Amendment dated Jun. 28, 2012", w/English claims, 4 pgs.
"Japanese Application Serial No. 2014-223143, Notice of Reason for Rejection dated Sep. 15, 2015", W/ English Claims, 2 pgs.
"Japanese Application Serial No. 2014-223143, Response filed Dec. 21, 2015 to Notice of Reason for Rejection dated Sep. 15, 2015", W/ English Claims, 14 pgs.
"Japanese Application Serial No. 2014-223143, Voluntary Amendment filed Nov. 25, 2014", W/ English Claims, 13 pgs.
"Japanese Application Serial No. 2015-242537, Office Action dated Sep. 27, 2016", w/ English Translation, 6 pgs.
"Japanese Application Serial No. 2015-543034, Office Action dated Apr. 19, 2016", With English Translation, 7 pgs.
"Japanese Application Serial No. 2015-543034, Response filed Jul. 14, 2016 to Office Action dated Apr. 19, 2016", w/ English Translation, 4 pgs.
"Japanese Application Serial No. 2015-543034,Voluntary Amendment dated Mar. 14, 2016", w/ English Claims, 11 pgs.
"Korean Application Serial No. 10-2012-57704, Office Action dated Aug. 17, 2012", w/English translation, 5 pgs.
"Korean Application Serial No. 10-2012-57704, Response filed Oct. 17, 2012 to Office Action dated Aug. 17, 2012", w/English claims, 21 pgs.
"Korean Application Serial No. 2014-7002621, Non Final Office Action dated Jan. 16, 2015", W/ English Translation, 8 pgs.
"Korean Application Serial No. 2014-7002621, Response filed Mar. 16, 2015 to Non Final Office Action dated Jan. 16, 2015", W/ English Claims, 23 pgs.
"Korean Application Serial No. 2015-7033200, Office Action dated Feb. 18, 2016", W/ English Translation, 8 pgs.
"Korean Application Serial No. 2015-7033200, Response filed Apr. 18, 2016 to Office Action dated Feb. 18, 2016", w/ English Claims, 16 pgs.
"Korean Applicaton Serial No. 2015-7006635, Non Final Office Action dated Apr. 29, 2015", W/ English Translation, 5 pgs.
"Network Architecture Architecture, detailed Protocols and Procedures WiMAX® Over-The-Air General Provisioning System Specification", WMF-T33-103-R015v03, (Nov. 30, 2010), 29 pgs.
"Roaming Indicator—CDGWiki", [Online]. Retrieved from the Internet: <https://web.archive.org/web/20100216234113/http://wiki.cdg.org/wiki/Roaming_Indicator> cator, (Feb. 16, 2010), 1 pg.
"The Future of Hotspots: Making Wi-Fi as Secure and Easy to Use as Cellular", Cisco, White Paper, (2012), 9 pgs.
"Wi-Fi Certified Passpoint", Xirrus White Paper, (2012), 5 pgs.
"Wi-Fi Certified Passpoint (Release 1) Deployment Guidelines", Wi-Fi Alliance Hotspot 2.0 Technical Task Group. Version 1.0, (Oct. 2012), 25 pgs.
"Wi-Fi Certified Passpoint Architecture for Public Access", Aruba White Paper, (2011), 15 pgs.
"WiMAX Forum Network Architecture (Stage 2 and Stage 3: Detailed Protocols and Procedures)[WiMAX Over-The-Air Provisioning & Activation Protocol based on OMA DM Specifications", Wimax Forum Network Architecture—Wimax Over-The-Air Provisioning & Activation Protocol Based on Oma Dm Specifications, vol. Release 1.5, No. Version 1.0.0, (Mar. 26, 2008), 83 pgs.
"WiMAX Forum Network Architecture (Stage 2 and Stage 3: Detailed Protocols and Procedures)[WiMAX Over-The-Air Provisioning & Activation Protocol based on OMA DM Specifications", WMF-T33-104-R015v02, (Mar. 26, 2008), 78 pgs.
"WiMAX Forum Network Architecture , detailed Protocols and Procedures Over-The-Air Provisioning & Activation Protocol based on TR-069 Specification", Wimax Forum WM F-T33-105-R015v01, (Nov. 21, 2009), 73 pgs.
"WISPr 2.0", Wireless Broadband Alliance. Doc Ref. No. WBA/RM/WISPr Version 01.00, (Apr. 8, 2010), 58 pgs.

(56) References Cited

OTHER PUBLICATIONS

"WPATM Deployment Guidelines for Public Access Wi-Fi® Networks", [Online]. Retrieved from the Internet: <http://www.paratorpes.es/cisco/WPA_for_Public_Access_Final.pdf>, (Oct. 28, 2004), 47 pgs.
Aboba, Bernard, "IEEE P802.11 Wireless LANs: Virtual Access Points", [Online]. Retrieved from the Internet: <URL: http://aboba.drizzlehosting.com/IEEE/11-03-154r1-I-Virtual-Access-Points.doc>, (May 22, 2003), 13 pgs.
Cinu, Chacko, "OTA-DM (Over the Air Device Management)", [Online]. Retrieved from the Internet: <http://hosteddocs.ittoolbox.com/CC012507.pdf>, (Feb. 2, 2007), 4 pgs.
Dantu, Ram, et al., "EAP methods for wireless networks", Computer Standards & Interfaces vol. 29 Issue 3, (Mar. 2007), 289-301.
Latze, Carolin, et al., "Roaming, Accounting and Seamless Handover in EAP-TLS Authenticated Networks", Telecommunications and Computer Networks, 16th International Conference on,IEEE, (2008), 85-89.
Nie, Pin, et al., "Flexible Single Sign-On for SIP: Bridging the Identity Chasm", IEEE International Conference on Communications, 2009. ICC '09., (2009), 1-6.
Pfitzmann, Birgit, "Privacy in enterprise identity federation—policies for Liberty 2 single sign on pet 2003", Proc. 3rd Workshop on Privacy Enhancing Technologies (PET 2003)., (2003), 1-19.
Stephenson, Dave, et al., "Secondary NAI Realm List", IEEE 802.11-09/1214r2,IEEE mentor, (Nov. 2009), 6 pgs.
"U.S. Appl. No. 15/198,090, Non Final Office Action dated Oct. 13, 2017", 24 pgs.
"U.S. Appl. No. 15/198,090, Response filed Jan. 16, 2018 to Non Final Office Action dated Oct. 13, 2017", 10 pgs.
"U.S. Appl. No. 15/495,404, Non Final Office Action dated Aug. 17, 2017", 11 pgs.
"U.S. Appl. No. 15/495,404, Notice of Allowance dated Jan. 24, 2018", 6 pgs.
"U.S. Appl. No. 15/495,404, Response filed Nov. 7, 2017 to Non Final Office Action dated Aug. 17, 2017", 7 pgs.
"Chinese Application Serial No. 201280036196.9, Response filed Sep. 4, 2017 to Office Action dated Jun. 19, 2017", w/ claims in English, 45 pgs.
"Chinese Application Serial No. 201380060673.X, Office Action dated Sep. 25, 2017", w/English Translation, 12 pgs.
"U.S. Appl. No. 15/198,090, Final Office Action dated Mar. 14, 2018", 29 pgs.
"Chinese Application Serial No. 201380060673.X, Response filed Feb. 11, 2018 to Office Action dated Sep. 25, 2017", w/ English Claims, 18 pgs.
"Chinese Application Serial No. 201380069265.0, Office Action dated Jan. 3, 2018", w/ English Translation, 10 pgs.
"U.S. Appl. No. 15/495,404, Corrected Notice of Allowance dated May 9, 2018", 2 pgs.
"Chinese Application Serial No. 201380069265.0, Office Action dated Sep. 30, 2018", W/ partial English Translation, 12 pgs.
"Chinese Application Serial No. 201380069265.0, Response filed May 18, 2018 to Office Action dated Jan. 3, 2018", w/ English Claims, 23 pgs.
"Chinese Application Serial No. 201610042047.3, Office Action dated Apr. 16, 2018", w/ partial English Translation, 15 pgs.
"Chinese Application Serial No. 201610042047.3, Response filed Aug. 31, 2018 to Office Action dated Apr. 16, 2018", w/ English claims, 11 pgs.
"Chinese Application Serial No. 201810039879.9, Voluntary Amendment filed Sep. 14, 2018", w/ English claims, 11 pgs.

* cited by examiner

OMA-DM TREE

SECURE ON-LINE SIGN-UP AND PROVISIONING FOR WI-FI HOTSPOTS USING A DEVICE-MANAGEMENT PROTOCOL

CROSS REFERENCE TO RELATED APPLICATION

This application is a continuation of U.S. patent application Ser. No. 13/188,205, filed Jul. 21, 2011, now issued as U.S. Pat. No. 9,571,482, which is incorporated by reference herein in its entirety.

This application is related to U.S. patent application Ser. No. 13/173,338, entitled "MOBILE DEVICE AND METHOD FOR AUTOMATIC CONNECTIVITY, DATA OFFLOADING AND ROAMING BETWEEN NETWORKS," filed Jun. 30, 2011.

TECHNICAL FIELD

Embodiments pertain to wireless fidelity (Wi-Fi) networks. Some embodiments pertain to secure on-line sign-up and provisioning of credentials for service and connectivity. Some embodiments relate to secure on-line sign-up and provisioning using a device-management protocol such as an Open Mobile Alliance Device-Management (OMA-DM) protocol. Some embodiments relate to Hotspot 2.0 networks and the Hotspot 2.0 evolution.

BACKGROUND

One issue with subscription establishment with a service provider for Wi-Fi network access is that it is not a simple and user-friendly process. There is no standardized process for secure on-line sign-up and provisioning credentials for Wi-Fi enabled devices and networks. Users generally may have to confront web pages of different types, enter information and select their usernames/passwords at different locations.

Another issue with subscription establishment is security. Open networks may not provide the necessary security while secure networks (such as those that are 802.1x enabled) may prohibit access to non-registrants. Current online sign-up mechanisms expose users to great security risks such as getting their credit card and personal information stolen (e.g., thru well-known honey-pot, twin-evil security holes).

Another issue with subscription establishment is the different types of credentials that are to be provisioned. Some devices or networks may require certificate-based credentials while some other devices or networks may simply require username/password credentials. Other devices or networks may require subscriber-information module (SIM) type credentials (e.g., generally used for some cellular networks).

Thus, there are general needs for secure on-line sign-up and provisioning of credentials. There are also general needs for secure on-line sign-up and provisioning of credentials securely using on-line sign systems that use a device-management protocol as a transport. There are also general needs for a standardized process for secure on-line sign-up that is suitable for provisioning different types of credentials such as username/password credentials, SIM type credentials and certificate-based credentials. There are also general needs for a standardized process for secure on-line sign-up and provisioning of credentials that is suitable for use in any 802.11 based network including both open and secure networks.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
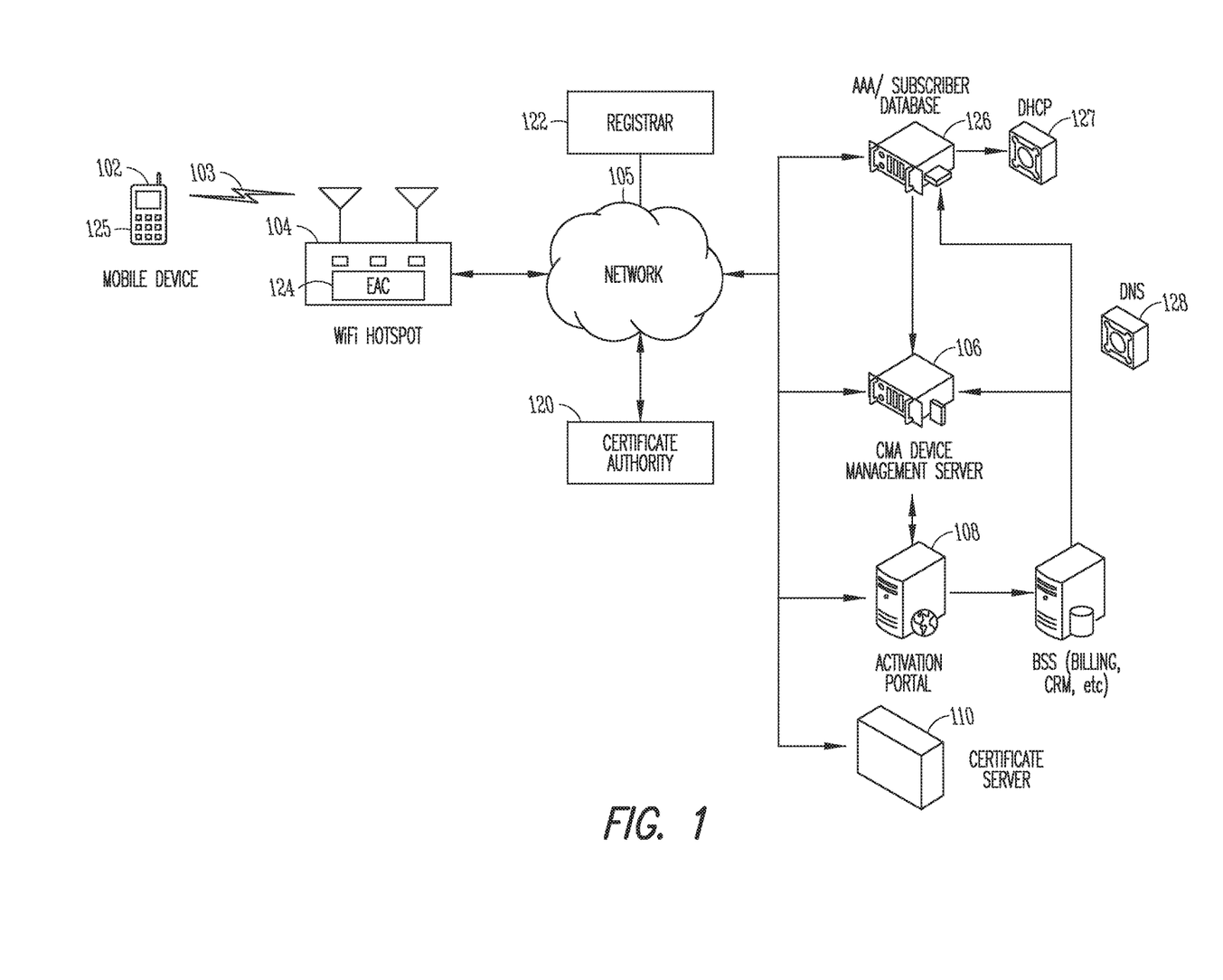
FIG. 1 illustrates an operational environment of network elements for secure on-line sign-up and provisioning of credentials in accordance with some embodiments.

FIG. 1 illustrates an operational environment of network elements for secure on-line sign-up and provisioning of credentials in accordance with some embodiments. Mobile device 102 may be a Wi-Fi enabled device that is configured to associate with a Wi-Fi hotspot 104 and perform the various operations described herein for secure on-line sign-up and provisioning. The Wi-Fi hotspot 104 may provide Internet access over a wireless local area network (WLAN) with a router connected to a link to an Internet service provider. The Wi-Fi hotspot 104 may be part of a Wi-Fi network and may be coupled to a network 105, such as the Internet or through a gateway to other various network elements including a certificate authority 120, a sign-up server 106, an activation portal 108, a certificate enrollment server 110, and a registrar 122 among others. In some embodiments, the sign-up server 106 may be an OMA-DM server that is configured to implement an OMA-DM protocol. The Wi-Fi hotspot 104 may operate as a Wi-Fi access point (AP). The mobile device 102 may include a device management client 125 to implement a device-management protocol, such as OMA-DM, and perform various operation described herein.

In some embodiments, the Wi-Fi hotspot 104 may include an embedded access controller (EAC) 124 to serve as a management entity for the Wi-Fi hotspot 104. The EAC 124 may manage several access points of the Wi-Fi network and may operate as a gateway for a WLAN access network to provide access to other networks such as the Internet. The EAC 124 may perform various operations described here to allow mobile devices access to a Wi-Fi network.

In accordance with embodiments, the mobile device 102 may be configured for secure on-line sign-up and provisioning of credentials for Wi-Fi hotspots. In some embodiments, the mobile device 102 may be configured for secure on-line sign-up and provisioning for Wi-Fi hotspots using a device management protocol, such as the OMA-DM protocol. In these embodiments, the mobile device 102 and sign-up server 106 may exchange request and response messages that are configured in accordance with the OMA-DM protocol. These messages are referred to as OMA-DM package 1 messages, OMA-DM package 2 messages, OMA-DM package 3 messages, and OMA-DM package 4 messages. The OMA-DM protocol may be specified by the OMA-DM Working Group and the Data Synchronization (DS) Working Group in an OMA-DM specification.

In some embodiments, the secure on-line sign-up and provisioning process described herein allows users to establish a subscription with a service provider and download credentials and operator policy onto a client device, such as the mobile device 102, in a secure manner using the OMA-DM protocol as a transport. This may allow cellular-type network service providers that may already be implementing an OMA-DM protocol in their backend core networks to use the same servers and installed components to extend that functionality for servicing Wi-Fi networks. In this way, Wi-Fi networks may operate along with the same cellular-network backend core enabling offloading from the cellular-type networks in a more seamless and transparent manner. A cellular-type network may refer to any 2G (e.g., GSM (Global System for Mobile Communications), EDGE (Enhanced Data rates for GSM Evolution)) or 3G (e.g., 3GPP (The Third Generation Partnership Project), 3GPP2 (The Third Generation Partnership Project 2)) or 4G (e.g., WiMAX (Worldwide Interoperability for Microwave Access), LTE (Long-Term Evolution)) configured network.

Some embodiments provide a standardized process for secure on-line sign-up and provisioning credentials including username/password credentials, certificate-based credentials and SIM-type credentials. The standardized process for secure on-line sign-up and provisioning credentials may use an OMA-DM protocol in any IEEE 802.11-based network making the process applicable to both open and secure networks. A secure Wi-Fi network, for example, may implement security in accordance with a robust-security network (RSN) protocol. Such a network may be considered an RSN network (i.e., a security network that allows the creation of robust security network associations (RSNAs)).

Accordingly, users no longer have to confront web pages of different types and enter information and select their usernames/passwords at different locations. Wi-Fi networks may now be easier to use and are more secure. The use of an OMA-DM protocol allows Wi-Fi network operations to be easily integrated with current and future cellular-type networks. In some embodiments, secure on-line sign-up and provisioning of credentials may be performed automatically and without user interaction.

In accordance with embodiments, the mobile device 102 may be configured with registrar information, such as the URL (uniform resource locator) of the registrar 122. The registrar 122 may contain service provider entries, which may include the service provider fully qualified domain name (FQDN), the service provider friendly name, and the service provider on-line sign-up root trust. The registrar 122 may provide cryptographic binding between the service-provider domain name and other data. The registrar 122 may be used by the mobile device 102 to establish a trust relationship between the mobile device 102 and an online sign-up server, such as sign-up server 106. When the mobile device 102 initiates on-line sign-up, it may query the registrar 122 for metadata of the on-line sign-up server and may verify the authenticity of the on-line sign-up service provider. The mobile device 102 may also download the registry information in advance and may store it locally and use it when it initiates the secure on-line sign-up and provisioning process described herein. If the mobile device 102 is a dual-mode mobile device (having both cellular network capability and Wi-Fi network capability), the mobile device 102 may also be configured to query the registrar 122 in real-time using a cellular-network connection to retrieve on-line sign-up server information and verify authenticity.

In accordance with embodiments, the mobile device 102 may be configured to associate with a Wi-Fi hotspot 104 of a Wi-Fi network and establish a transport-layer security (TLS) session with the sign-up server 106 through the Wi-Fi hotspot 104 to receive a digital certificate of the sign-up server 106. The mobile device 102 may also be configured to send a client-initiated OMA-DM package 1 message to the sign-up-server 106. The OMA-DM package 1 message may include device information and a generic alert that is set to subscription creation. An OMA-DM package 2 message that includes a Launch-Browser-to-URL (Uniform Resource Locator) command for execution by the mobile device 102 may be received from the sign-up server 106 in response to the package 1 message.

Upon receipt of the OMA-DM package 2 message, a secure Hypertext Transfer Protocol (HTTPS) connection to a URL identified in the OMA-DM package 2 message may be established by the mobile device 102 by executing the Launch-Browser-to-URL command and sending an HTTPS GET request over the secure HTTP connection to the identified URL. The URL may be associated with the activation portal 108. The mobile device 102 may exchange information over the established secure HTTP connection with the activation portal 108 to provision a subscription for Wi-Fi network access and create a subscription management object (MO). The subscription MO may include a reference to the type of credentials (e.g., username/password, SIM-type or certificate-based) that have been provisioned for automatic connectivity to certain Wi-Fi networks including Hotspot 2.0 networks.

In the case of username/password credentials, the subscription MO may include a username and password. In the case of SIM-type credentials, the subscription MO may include at least some basic information about the SIM-type credentials. In the case of certificate-based credentials, the subscription MO may include information for accessing certificate-based credentials. These embodiments are described in more detail below.

Although many embodiments are described herein for secure on-line sign-up and provisioning for Wi-Fi Hotspot 2.0 networks, the scope of the invention is not limited in this respect. Other embodiments are applicable to secure on-line sign-up and provisioning for other types of networks including other wireless local-area networks (WLANs) and cellular-type networks.

In accordance with some embodiments, the certificate authority 120 may be a Hotspot 2.0 Certificate Authority (CA) (i.e., the Root Trust) and may be configured to issue certificates including Hotspot 2.0 certificates. The registrar 122 may be where a company or organization that may be registered as a Hotspot 2.0 service provider. The registrar 122 may include an already registered FQDN and/or a chosen friendly name. The FQDN owner may be identified in a publically available "WHOIS" database. The chosen friendly name should not be similar or confused with already registered friendly names. The registrar 122 may invoke rules for registration that may allow the rejection of a requested friendly name, if not appropriate. The registrar 122 may maintain the database of registered service providers along with their friendly names and remove invalid entries. A Hotspot 2.0 certificate from the certificate authority 120 may only be issued to a registered entity (i.e., registered with the registrar database). The certificate may have a lifetime that does not exceed the FQDN registration lifetime. In some cases, the registrar 122 may also act as a certificate authority.

In accordance with embodiments, the mobile device 102 may obtain one or more Hotspot 2.0 root certificate(s) from the certificate authority 120 and the root certificate may identify the server's FQDN and indicate that it is usable for HTTPS based authentication for on-line sign-up and provisioning of credentials. The Hotspot 2.0 service provider may provision the on-line sign-up server 106 with certificates from the certificate authority 120 and may provision appropriate policy settings on the on-line sign-up server 106. These embodiments are discussed in more detail below.

A service provider's network may also include an authentication, authorization, and accounting (AAA) server 126 that includes, among other things, a subscriber database. The AAA server 126 may communicate with network elements such as a Dynamic Host Configuration Protocol (DHCP) server 127 for dynamic allocation of IP addresses and Domain Name Server (DNS) 128 for domain-name translation, as well as performing other networking operations.

In some embodiments, the Wi-Fi hotspot 104 may be a Wi-Fi Hotspot 2.0 operating in accordance with a Hotspot 2.0 evolution specification, such as the Hotspot 2.0 evolution specification of the Wi-Fi Alliance. The mobile device 102 may be a Hotspot 2.0 enabled device and the subscription information may include pre-provisioned subscription information for automatic connection to a Wi-Fi Hotspot 2.0. A Wi-Fi network may be a wireless network including a Wi-Fi hotspot configured to operate in accordance with one of the IEEE 802.11 standards (and amendments thereto) for WLANs.

A Wi-Fi network may use a carrier-sense multiple access technique with collision avoidance (CSMA/CA) in which upstream and downstream communications use the same frequency channels in accordance with a time-division multiplexed process. Some Wi-Fi networks may use orthogonal frequency division multiplexing (OFDM). Cellular networks, on the other hand, such as 4G LTE networks and WiMAX networks, implement an orthogonal-frequency division multiple access (OFDMA) technique. 3G cellular networks may use a code-division multiple access (CDMA) technique. In some embodiments, the mobile device 102 may be a dual-mode device having physical-layer circuitry configured for communicating with both Wi-Fi and cellular networks.

Figure 2:
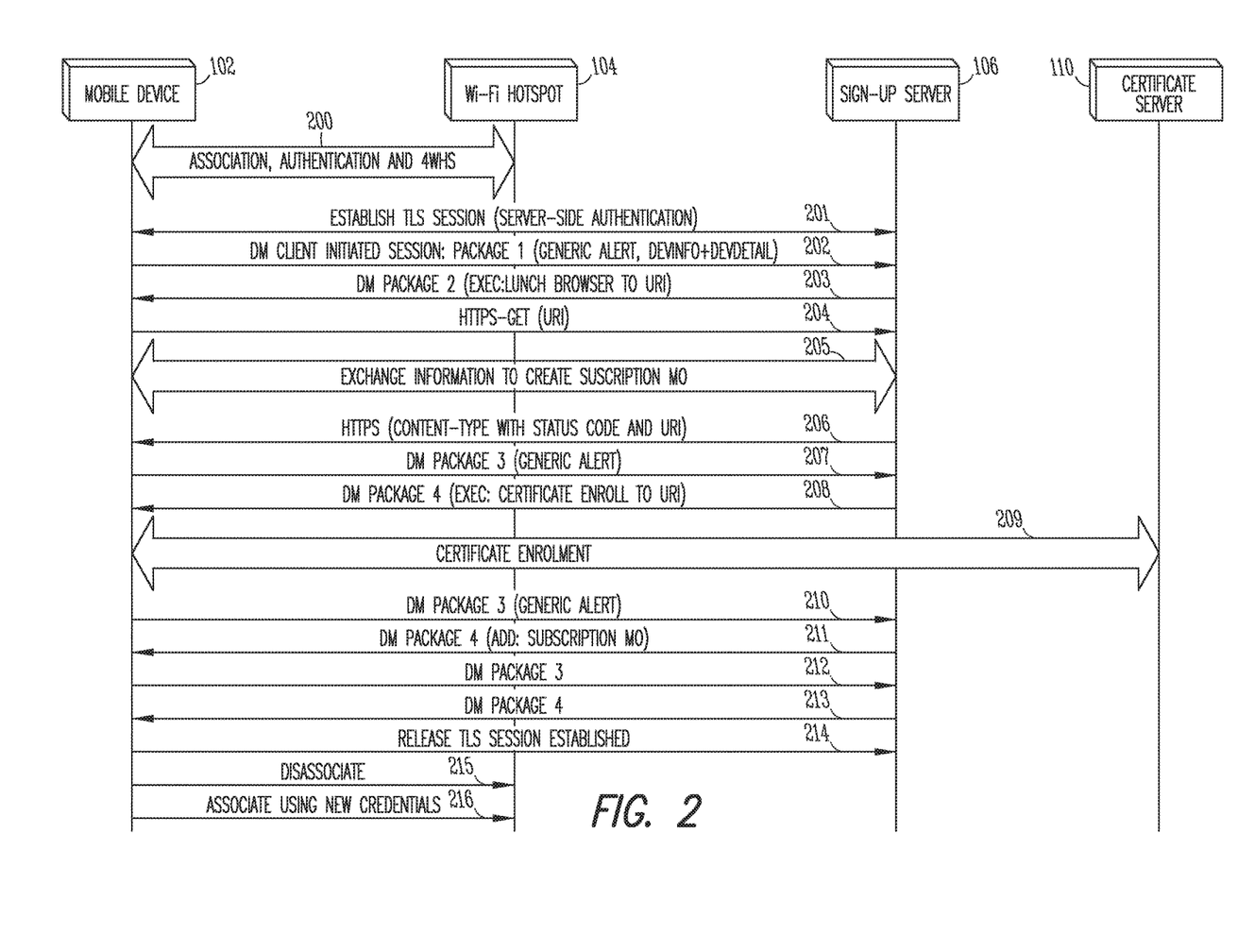
FIG. 2 illustrates the messages exchanged between some network elements for secure on-line sign-up and provisioning of credentials in accordance with some embodiments.

FIG. 2 illustrates messages exchanged between some network elements as part of a procedure for secure on-line sign-up and provisioning of credentials in accordance with some embodiments. Some operations of the procedure may be performed the device management client 125 (FIG. 1) of the mobile device 102, while other operations may be performed by the embedded access controller 126 (FIG. 1) of the Wi-Fi hotspot 104 (FIG. 1), the sign-up server 106 and the certificate enrollment server 110.

In operation 200, the mobile device 102 may associate with a Wi-Fi hotspot 104. In some embodiments, the mobile device 102 may initially scan for Hotspot 2.0 enabled networks and may also look for indications in the beacon of a Wi-Fi hot spot to determine if the Wi-Fi network is secure (e.g., RSN-enabled and whether it has support for Hotspot 2.0 connectivity. The mobile device 102 may select the most appropriate network based on user preferences. If the mobile device 102 determines that it does not have a subscription with the selected service provider, it may be configured to automatically engage in on-line sign-up and provisioning (i.e., without user intervention) as discussed in more detail below.

For RSN enabled networks, the mobile device 102 may be configured to access the RSN-enabled network without credentials. In these embodiments, the mobile device 102 may be configured to send a generic server access (GAS) request (such as an IEEE 802.11u based GAS request) to request an on-line sign-up Network Access Identifier (NAI). The on-line sign-up NAI may be received from the network using the GAS query. After receiving the NAI, the mobile device 102 may use the NAI in an Extensible Authentication Protocol (EAP) authentication process to indicate to the network that it intends to sign-up for service and create credentials for provisioning. The network may be configured to allow access to the mobile device 102 for this purpose without requiring user authentication. The mobile device 102 may then perform server-side authentication as discussed in more detail below in operation 201.

In some embodiments, operation 200 may include performing a four-way handshake (4WHS) to allow the mobile device 102 and the authenticator to derive session keys from a master key generated after the EAP authentication process. The 4WHS may be in accordance with IEEE 802.11i, although this is not a requirement.

In operation 201, the mobile device 102 may be configured to establish a TLS session with a sign-up server 106 through the Wi-Fi hotspot 104 to receive the certificate of the sign-up server 106. The certificate may be a hotspot 2.0 certificate that may be issued by a hotspot 2.0 certificate authority (i.e., a Root Trust) and may be referred to as a root certificate.

In some embodiments, the mobile device 102 may establish the TLS session in operation 201 with the sign-up server 106 in accordance with the procedures of RFC 2560 and may perform server-side authentication using HTTPS. In some embodiments, after establishing the TLS session with the sign-up server 106, the mobile device 102 may verify that the certificate of the sign-up server 106 has been signed by a Hotspot 2.0 trust root. When the mobile device 102 verifies or is able to verify that the certificate of the sign-up server 106 has been signed by the Hotspot 2.0 root trust, the mobile device 102 may be configured to perform operation 202 to initiate new subscription establishment.

Embodiments disclosed herein are applicable to both open networks as well as a secure 802.1x type of a network since a TLS session is established for credentials provisioning. Thus, the same process described below may be used for both open/unsecure Wi-Fi networks and secure Wi-Fi networks (e.g., with 802.1x security).

In some embodiments, to verify that the certificate of the sign-up server 106 has been signed by a Hotspot 2.0 root trust, the mobile device 102 may use a public key of the Hotspot 2.0 root trust to verify the certificate. The public key may be obtained from a key server or from a storage element within the mobile device 102. When the mobile device 102 is unable to verify that the sign-up server's certificate has been signed by a Hotspot 2.0 root trust, or when the sign-up server's certificate has not been signed by a Hotspot 2.0 root trust, the mobile device 102 may abort the on-line sign-up and provisioning process and release/end the established TLS session.

In operation 202, the mobile device 102 may send an OMA-DM package 1 message (i.e., a client-initiated message) to the sign-up-server 106. The OMA-DM package 1 message may include device information and a generic alert that is set to subscription creation. The generic alert of this OMA-DM package 1 message may indicate that the user of the mobile device 102 wishes to establish a new subscription with the service provider. The package 1 message may be sent over a wireless link 103 (FIG. 1) implementing the TLS session.

In operation 203, the mobile device 102 may receive from the sign-up-server 106 an OMA-DM package 2 message that includes a Launch-Browser-to-URL command for execution by the mobile device 102 in response to the package 1 message. In these embodiments, the OMA-DM package 2 message received in operation 203 is a response message that is received in response to the package 1 message sent in operation 202. The OMA-DM package 1 message sent in operation 202 is a request message. The use of the OMA-DM protocol may provide for these response and request messages.

In some embodiments, the sign-up server 106 may indicate in the OMA-DM package 2 message received in operation 203 the type of credentials to be provisioned (e.g., username/password credentials, SIM-type credentials or certificate-based credentials). For example, some service providers may require certificate-based credentials, while other service providers may only require username/password credentials. When username/password credentials are to be provisioned, a username and password may be generated by the sign-up server 106 and are later returned as part of the subscription MO received. On the other hand, when certificate-based credentials are to be provisioned, a subscription certificate issued by the certificate enrollment server is returned in operation 208 and the subscription MO is received in operation 211. These embodiments are described in more detail below.

In some embodiments, the OMA-DM package 2 message received in operation 203 that includes the Launch-Browser-to-URL command may be generated by the sign-up server 106 in response to receipt of the OMA-DM package 1 message sent by the mobile device 102 in operation 202. The OMA-DM package 2 message may be received in operation 203 over the wireless link 103 implementing the established TLS session.

In operation 204, the mobile device 102 may establish, upon receipt of the OMA-DM package 2 message, a HTTPS connection to a URL identified in the OMA-DM package 2 message by executing the Launch-Browser-to-URL command and may send an HTTPS GET request over the HTTPS connection to the identified URL. The URL may be associated with the activation portal 108 (FIG. 1). The HTTPS GET request may be configured to retrieve a URL from the activation portal 108 for subscription establishment. The activation portal 108 may be associated with the particular service provider.

In operation 205, the mobile device 102 may exchange information over the established HTTPS connection with the activation portal 108 to provision credentials for a subscription for Wi-Fi network access and create the subscription MO. In some embodiments, exchanging information in operation 205 includes providing information about the user (e.g., user identification information), selecting appropriate subscription/rate plans, providing payment information (e.g., credit card or other payment information) if required and establishing policy and other appropriate parameters.

When the subscription credentials are provisioned successfully, the mobile device 102 may receive, in operation 206, an indication from the sign-up server 106 that subscription credentials were provisioned successfully along with the URL from which the subscription MO can be retrieved. The URL may be received as part of an HTTPS response message. When the subscription credentials were not provisioned successfully, operation 213 may be performed.

In operation 207, the mobile device 102 may send an OMA-DM package 3 message to the sign-up server 106 to retrieve a URL of a certificate enrollment server. The OMA-DM package 3 message may include a generic alert that is configured depending on whether certificate enrollment with the service provider is being performed. The generic alert of the OMA-DM package 3 message may indicate that the user of the mobile device 102 is not performing certificate enrollment with the service provider (e.g., the generic alert may be set to OMA-DM sign-up server). If there is an error in establishment of the new subscription, operation 213 may be performed.

When certificate enrollment is not being performed, the mobile device may receive, in operation 208, an OMA-DM package 4 message from the sign-up server 106. When certificate enrollment is not being performed, the OMA-DM package 4 message may include an ADD command and indicate a location on an OMA-DM tree of the mobile device 102. In response to the ADD command, the mobile device 102 may be configured to add the subscription MO to the location on the OMA-DM tree of the mobile device 102.

Figure 3:
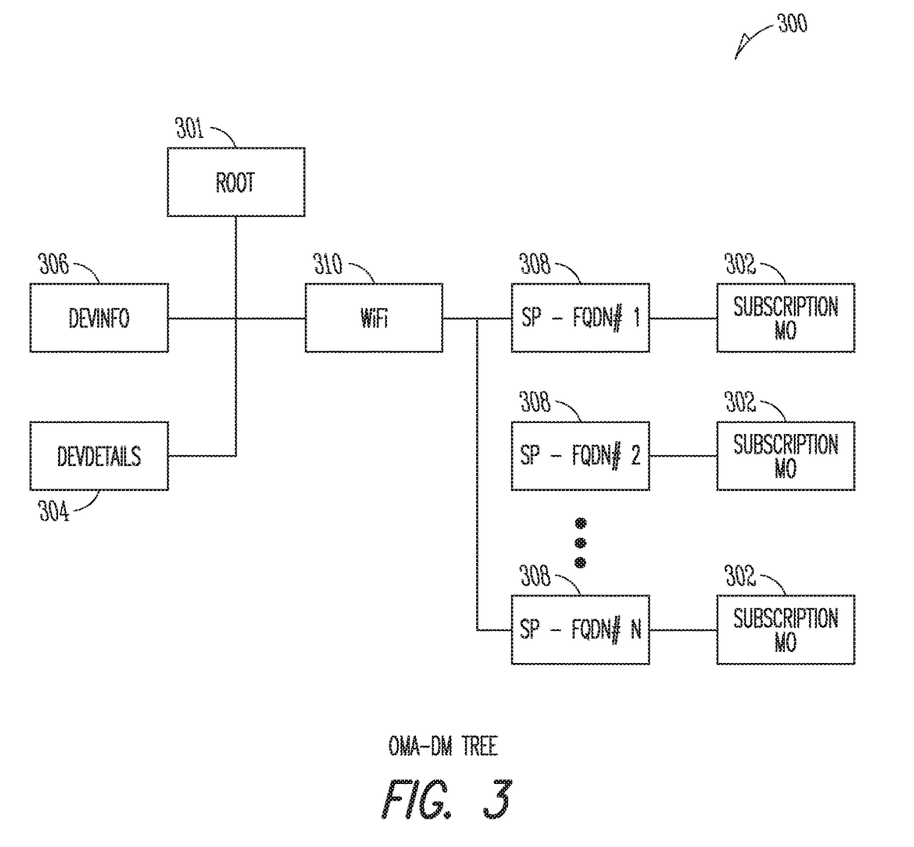
FIG. 3 illustrates an OMA-DM tree in accordance with some embodiments.

FIG. 3 illustrates an OMA-DM tree in accordance with some embodiments. OMA-DM tree 300 may be stored in mobile device 102 and may include tree root 301, a subscription MO 302 for each service provider (SP) as well as the FQDN 308 for each service provider. The OMA-DM tree 300 may also include a device information MO 306 (DEVINFO) and a device detail MO 304 (DEVDETAILS). The OMA-DM package 1 message sent in operation 202 includes the device information MO 306 and the device detail MO 304. The OMA-DM tree 300 may also include Wi-Fi MO 310 for device specific Wi-Fi objects.

In some embodiments, the device detail MO 304 may include device information such as model, vendor info, type of adaptor, adaptor configuration, etc. and user information. The device detail MO 304 may include additional information such as URI (uniform resource identifier) from where additional info specific to device may be obtained, device type (e.g., PC Card, USB (Universal Serial Bus), modem, express card, gaming device, music player, navigation device), OEM (Original Equipment Manufacturer) name, firmware version, software version, hardware version and whether the host device supports OMA-DM large object handling. The device info MO 306 may include a unique identifier (e.g., the GUID (Globally Unique Identifier)) for host device, a manufacturer identifier, device model, OMA-DM client version identifier, and the language setting of the host device.

In accordance with embodiments, to support the activation and provisioning process, hotspot 2.0 uses the OMA-DM client as a building block in the activation and provisioning process. The device management client 125 of mobile device 102 may be configured to support a standard OMA-DM bootstrap which may enable the device management client 125 to receive device management account updates and start a conversation with OMA-DM servers in a Wi-Fi network. The device management client 125 may be configured to download firmware updates for the mobile device 102. The device management client 125 may be responsible for OMA-DM tree exchanges between the mobile device 102 using a device management tree in XML (Extensible Markup Language). The device management client 125 may also be configured with credential/policy provisioning firmware and configured to perform device configuration updates between client and the OMA DM server (e.g., sign-up server 106), as well as for collection of device diagnostics information for a diagnostics server.

Referring back to FIG. 2, when certificate enrollment is not being performed and after the subscription MO 302 (that included username/password credentials) is added to the OMA-DM tree 300 of the mobile device 102, the mobile device 102 may release the previously established TLS session in operation 214 and may de-associate with the Wi-Fi Hotspot 104 in operation 215. The subscription MO 302 is now available for use by the mobile device 102 to automatically connect and associate with a Wi-Fi network in operation 216 which may be operated by the service provider as well as those operated by roaming partners. In some embodiments, the mobile device 102 may be configured to use the same Service Set Identification or Homogeneous Extended Service Set Identification (SSID/HESID) to associate to the Wi-Fi network with the newly obtained credentials (i.e., establish a new Layer 2 and/or layer 3 (L2/L3) connection).

When certificate enrollment is being performed, the generic alert of the OMA-DM package 3 message sent in operation 207 may be set to 'certificate enrollment'. In these embodiments, the user of the mobile device 102 wishes to perform certificate enrollment with the service provider. The OMA-DM package 4 message received in operation 208 in response may include a command-to-URL for certificate enrollment (e.g., Execute: CertificateEnrollToURL) to cause the mobile device 102 to connect to the certificate enrollment server 110 (FIG. 1) for certificate enrollment.

In response to receipt of the OMA-DM package 4 message received in operation 208, the mobile device 102 may be configured to execute the command-to-URL for certificate enrollment to perform certificate enrollment in operation 209 with the certificate enrollment server 110 that is indicated by the URL. The certificate enrollment procedure may be performed in accordance with a certificate-enrollment protocol (e.g., certificate-management protocol (CMP) or simple certificate enrollment protocol (SCEP)) to provision the mobile device 102 with a subscription certificate for authentication with the service provider.

In some embodiments, the certificate enrollment process may be configured to take less than sixty seconds under typical conditions. Typical conditions may include when the Wi-Fi hotspot and the core network of the service provider core are not congested and the certificate enrollment server 110 is not overloaded. At the end of a successful procedure, the mobile device 102 will have been provisioned a subscription certificate that is used for authentication with the network of that service provider. When unsuccessful, the mobile device will be notified of certificate enrollment failure.

The subscription certificate received in operation 209 may be an X.509 type certificate suitable for use for EAP-TLS based authentication with a network. In some embodiments, the subscription certificate may be an x.509v3 certificate and may be configured in accordance with an ITU-T (Telecommunication Standardization Sector of the International Telecommunication Union) standard for a public key infrastructure (PKI) for single sign-on (SSO) and Privilege Management Infrastructure (PMI).

In operation 210, the mobile device 102 may send, if certificate enrollment is successful, an OMA-DM package 3 message to the sign-up server 106. The OMA-DM package 3 may include a generic alert containing the URL received in operation 206 from which the subscription MO can be retrieved.

In operation 211, the mobile device 102 may receive an OMA-DM package 4 message from the sign-up server 106 that includes an ADD command and a location. The OMA-DM package 4 message may be a response message that is received in response to the OMA-DM package 3 message sent by the mobile device 102 in operation 210. In response to the ADD command, the mobile device 102 may add the subscription MO 302 to the indicated location on the OMA-DM tree 300 of the mobile device 102.

When username/password credentials are provisioned, the username and password generated by the sign-up server 106 are returned as part of the subscription MO received in operation 211. When certificate-based credentials are provisioned, the certificates issued by the certificate enrollment server 110 are returned in operation 209 and the subscription MO is received in operation 211.

In operation 212, the mobile device 102 may send an OMA-DM package 3 message indicating the status of operation 211. This message may confirm that the mobile device 102 was able to add the subscription MO 302 to its OMA-DM tree 300. In some embodiments, the subscription MO 302 may include a reference to the type of credentials required by the service provider.

In operation 213, the mobile device 102 may receive an OMA-DM package 4 message indicating the status of operation 212. In this way, the service provider can be made aware that the mobile device has successfully added the subscription MO 302 and has been provisioned credentials.

In operation 214, the mobile device may release the established TLS session that was established in operation 201 and may disassociate with the Wi-Fi network in operation 215. In operation 216, the mobile device may use the subscription MO 302 to associate and authenticate with a Wi-Fi network.

In some embodiments, operations 200-216 may be performed without user intervention and may be performed automatically. In some embodiments, all operations 200-216, (except possibly portions of operation 205) may be performed without user intervention and may be performed automatically.

Figure 4:
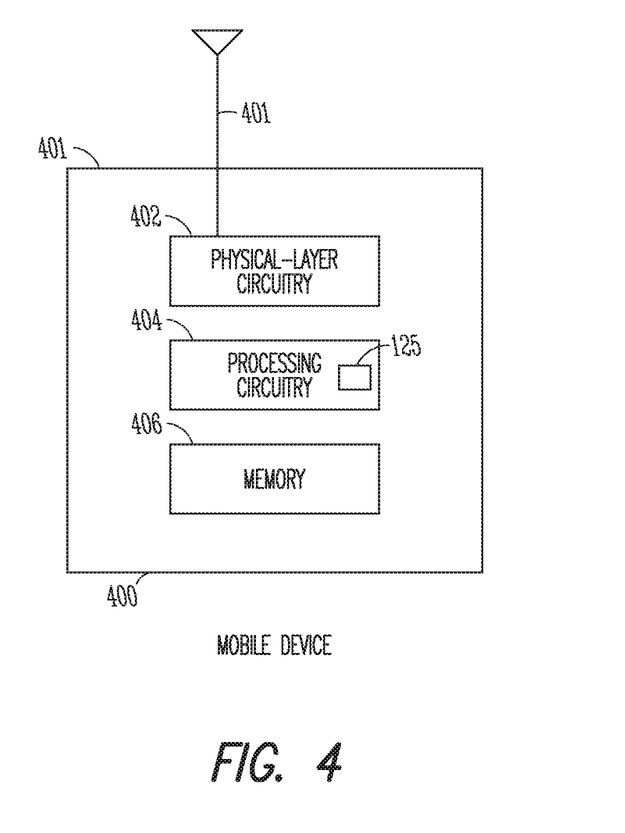
FIG. 4 illustrates a mobile device in accordance with some embodiments.

FIG. 4 illustrates a mobile device in accordance with some embodiments. Mobile device 400 may be suitable for use as mobile device 102 and may be configured to perform the various operations discussed above for secure on-line sign-up and provisioning of credentials.

Mobile device 400 may include physical-layer circuitry 402 configured for wireless communications with Wi-Fi hot spots, such as Wi-Fi hotspot 104 (FIG. 1) using one or more of antennas 401. Mobile device 400 may also include processing circuitry 404, which may be configured for performing the operations described herein along with memory 406 for storing, among other things, the provisioned credentials and a subscription MO 302 (FIG. 3) as well as the other elements of the OMA-DM tree 300 (FIG. 3). The processing circuitry 404 may be configured to implement a device management client 125 (FIG. 1) for performing a device-management protocol, such as the OMA-DM protocol and perform various operation described herein including responsibility for implementing the OMA-DM client operations. Mobile device 400 may also include other functional elements, such as media-access control (MAC) layer circuitry for media access control for performing other operations.

In the case of a single-mode mobile device, the physical layer circuitry 402 may be configured for communicating with Wi-Fi networks. In dual-mode embodiments, the physical layer circuitry 402 may be configured for communicating with both cellular networks and Wi-Fi networks. In dual-mode embodiments, the mobile device 400 may include both a Wi-Fi transceiver and one or more cellular network transceivers. In dual-mode embodiments, the mobile device 400 may also be configured to offload traffic from the cellular network to the available Wi-Fi networks.

In some embodiments, mobile device 102 may be a portable wireless communication device, such as a personal digital assistant (PDA), a laptop or portable computer with wireless communication capability, a web tablet, a wireless telephone, a smart-phone, a wireless headset, a pager, an instant messaging device, a digital camera, an access point, a television, a medical or health device, an entertainment device, or other device that may receive and/or transmit information wirelessly.

Antennas 401 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas 301 may be effectively separated to take advantage of spatial diversity and the different channel characteristics that may result between each of antennas 401 and the antennas of a transmitting station.

Although the mobile device 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of system 100 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, one or more processors and may be configured with instructions stored on a computer-readable storage device to implement the various operations described herein.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A device including one or more processors, the one or more processors including circuitry, the circuitry having logic to:
associate with a Wi-Fi Alliance Hotspot 2.0 (HS2.0)-enabled Wi-Fi network; establish a transport-layer security (TLS) session with a sign-up server;
send a first OMA-DM package 3 message over a wireless link of the TLS session, the first OMA-DM package 3 message including a generic alert;
send a second OMA-DM package 3 message over the wireless link of the TLS session subsequent to successful certificate enrollment; and
receive a first OMA-DM package 4 message in response to the second OMA-DM package 3 message, the first OMA-DM package 4 message to comprise a command to add a subscription management object (MO) to an OMA-DM tree of the device, the OMA-DM tree having a hierarchical structure comprised of at least a root and nodes, and wherein the OMA-DM tree comprises a fully-qualified domain name (FQDN) for at least one service provider, and a subscription MO for the at least one service provider.

2. The device of claim 1, wherein the logic is further to:
add the subscription MO to the OMA-DM tree in response to receipt of the first OMA-DM package 4 message.

3. The device of claim 2, wherein the logic is further to:
add the subscription MO to the OMA-DM tree based on a location specified in the first OMA-DM package 4 message.

4. The device of claim 1, wherein the OMA-DM tree comprises a device information (DevInfo) MO and a device detail (DevDetail) MO.

5. The device of claim 4, wherein the DevInfo MO comprises a unique identifier for the device, a manufacturer identifier, a device model identifier, an OMA-DM client version identifier, and a language setting for the device.

6. The device of claim 4, wherein the DevDetail MO comprises information to indicate whether the device supports OMA-DM large object handling.

7. The device of claim 1, wherein the OMA-DM tree comprises a Wi-Fi MO.

8. The device of claim 1, wherein the logic is further to:
send a third OMA-DM package 3 message to
indicate a status of the command comprised in the first OMA-DM package 4 message, and confirm an addition of the subscription MO to the OMA-DM tree.

9. The device of claim 8, wherein the logic is further to:
receive a second OMA-DM package 4 message in response to the third OMA-DM package 3 message;
release the TLS session; and
disassociate with the HS2.0-enabled Wi-Fi network following receipt of the second OMA-DM package 4 message.

10. The device of claim 9, wherein the logic is further to:
associate with a Wi-Fi network using credentials comprised in the subscription MO following the disassociation with the HS2.0-enabled Wi-Fi network.

11. The device of claim 1, wherein the logic is further to:
perform server-side authentication using a secure hypertext transfer protocol (HTTPS).

12. The device of claim 1, wherein the device further includes:
two or more antennas, and
a transceiver configured to be coupled to the two or more antennas.

13. A non-transitory computer-readable storage medium that stores instructions for execution by one or more processors to perform operations comprising:
associating with a Wi-Fi Alliance Hotspot 2.0 (HS2.0)-enabled Wi-Fi network;
establishing a transport-layer security (TLS) session with a sign-up server;

sending a first OMA-DM package 3 message over a wireless link of the TLS session, the first OMA-DM package 3 message including a generic alert;

sending a second OMA-DM package 3 message over the wireless link of the TLS session subsequent to successful certificate enrollment;

receiving a first OMA-DM package 4 message in response to the second OMA-DM package 3 message, the first OMA-DM package 4 message to comprise a command to add a subscription management object (MO) to an OMA-DM tree of the device, the OMA-DM tree having a hierarchical structure comprised of at least a root and nodes, and wherein the OMA-DM tree comprises a fully-qualified domain name (FQDN) for at least one service provider, and a subscription MO for the at least one service provider; and adding the subscription MO to the OMA-DM tree in response to receipt of the first OMA-DM package 4 message and based on a location specified in the first OMA-DM package 4 message.

14. The non-transitory computer-readable storage medium of claim 13, wherein the operations further comprise:

receiving a sign-up server certificate via the TLS session, the sign-up server certificate comprising an HS2.0 certificate issued by an HS2.0 certificate authority.

15. The non-transitory computer-readable storage medium of claim 14, wherein the operations further comprise:

verifying that the sign-up server certificate has been signed by an HS2.0 trust root using a public key of the HS2.0 trust root.

16. The non-transitory computer-readable storage medium of claim 13, wherein the operations further comprise:

sending an OMA-DM package 1 message over the wireless link in response to a determination that the sign-up server certificate has been signed by an HS2.0 trusted root, the OMA-DM package 1 message to comprise a generic alert set to subscription creation, a device information (DevInfo) MO and a device detail (DevDetail) MO.

17. The non-transitory computer-readable storage medium of claim 16, wherein the operations further comprise:

receiving an OMA-DM package 2 message in response to the OMA-DM package 1 message, the OMA-DM package 2 message comprising an Exec: LaunchBrowsertoURI command and to identify a uniform resource identifier (URI); and establishing a secure hypertext transfer protocol (HTTPS) connection to the URI identified by the OMA-DM package 2 message.

18. The non-transitory computer-readable storage medium of claim 17, wherein the operations further comprise:

sending an HTTPS GET request over the HTTPS connection; and exchanging information over the HTTPS connection to obtain subscription credentials, the information including at least one of a selection of a rate plan, payment information, and user identification information.

19. An apparatus for a station (STA), the apparatus comprising:

transceiver circuitry; and hardware processing circuitry to configure the transceiver circuitry to:

associate with a Wi-Fi Alliance Hotspot 2.0 (HS2.0)-enabled Wi-Fi network; establish a transport-layer security (TLS) session with a sign-up server;

send a first OMA-DM package 3 message over a wireless link of the TLS session, the first OMA-DM package 3 message including a generic alert;

send a second OMA-DM package 3 message over the wireless link of the TLS session subsequent to successful certificate enrollment; and receive a first OMA-DM package 4 message in response to the second OMA-DM package 3 message, the first OMA-DM package 4 message to comprise a command to add a subscription management object (MO) to an OMA-DM tree of the device, the OMA-DM tree having a hierarchical structure comprised of at least a root and nodes, and wherein the OMA-DM tree comprises a fully-qualified domain name (FQDN) for at least one service provider, and a subscription MO for the at least one service provider.

20. The apparatus of claim 19, wherein the hardware processing circuitry is further to configure the transceiver circuitry to determine that the HS2.0 hotspot supports HS2.0 connectivity based on an indication in a beacon of an HS2.0 access point (AP).

21. The apparatus of claim 19, wherein the hardware processing circuitry is further to configure the transceiver circuitry to perform server-side authentication using a secure hypertext transfer protocol (HTTPS).

* * * * *

UNITED STATES PATENT AND TRADEMARK OFFICE
CERTIFICATE OF CORRECTION

PATENT NO. : 10,341,328 B2
APPLICATION NO. : 15/431149
DATED : July 2, 2019
INVENTOR(S) : Gupta et al.

It is certified that error appears in the above-identified patent and that said Letters Patent is hereby corrected as shown below:

On the Title Page

On page 2, in Column 2, under "Other Publications", Line 1, delete "Affiance" and insert --Alliance-- therefor On page 4, in Column 2, under "Other Publications", Line 42, delete "Applicaton" and insert --Application-- therefor In the Claims In Column 11, Line 66, in Claim 1, after "network;", insert --¶--

In Column 12, Line 38, in Claim 8, after "to", delete "¶"

In Column 14, Line 21, in Claim 19, after "network;", insert --¶--

Signed and Sealed this
Fourteenth Day of April, 2020

Andrei Iancu
*Director of the United States Patent and Trademark Office*